United States Patent
Kuo et al.

(10) Patent No.: US 9,164,636 B2
(45) Date of Patent: Oct. 20, 2015

(54) TOUCH PANEL AND TOUCH DISPLAY PANEL

(71) Applicant: AU Optronics Corp., Hsin-Chu (TW)

(72) Inventors: Chia-Hao Kuo, Hsin-Chu (TW); Yu-Feng Chien, Hsin-Chu (TW); Seok-Lyul Lee, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 70 days.

(21) Appl. No.: 13/890,273

(22) Filed: May 9, 2013

(65) Prior Publication Data
US 2014/0168138 A1    Jun. 19, 2014

(30) Foreign Application Priority Data

Dec. 13, 2012  (TW) .............................. 101147246 A

(51) Int. Cl.
 *G06F 3/045*   (2006.01)
 *G06F 3/044*   (2006.01)
 *G06F 3/041*   (2006.01)

(52) U.S. Cl.
 CPC .............. *G06F 3/044* (2013.01); *G06F 3/0412* (2013.01); *G06F 2203/04111* (2013.01)

(58) Field of Classification Search
 None
 See application file for complete search history.

(56) References Cited

U.S. PATENT DOCUMENTS

| 7,129,935 | B2 | 10/2006 | Mackey |  |
|---|---|---|---|---|
| 7,995,041 | B2 | 8/2011 | Chang |  |
| 2008/0309633 | A1 | 12/2008 | Hotelling |  |
| 2009/0085885 | A1 | 4/2009 | Wu |  |
| 2009/0096764 | A1* | 4/2009 | You | 345/174 |
| 2010/0033668 | A1* | 2/2010 | Koito et al. | 349/155 |
| 2010/0188361 | A1* | 7/2010 | Kim et al. | 345/174 |
| 2010/0220075 | A1 | 9/2010 | Kuo |  |
| 2010/0224880 | A1* | 9/2010 | Kimura | 257/59 |
| 2011/0074729 | A1* | 3/2011 | Im et al. | 345/174 |
| 2012/0200511 | A1* | 8/2012 | Kim et al. | 345/173 |
| 2013/0127747 | A1* | 5/2013 | Ding et al. | 345/173 |

FOREIGN PATENT DOCUMENTS

| CN | 101131492 A | 2/2008 |
|---|---|---|
| TW | M422118 | 2/2012 |

* cited by examiner

*Primary Examiner* — Adam R Giesy
*Assistant Examiner* — Henok Heyi
(74) *Attorney, Agent, or Firm* — Winston Hsu; Scott Margo

(57) ABSTRACT

A touch panel includes first sensing pads, first bridge lines, second sensing pads, adjusting electrodes, second bridge lines and third bridge lines. The first sensing pad has a first opening. The first sensing pads and the first bridge lines are arranged alternately along a first direction and electrically connected to each other. The second sensing pads and the second bridge lines are arranged alternately along a second direction and electrically connected to each other. The adjusting electrodes are disposed in the first openings and the second openings, and the adjusting electrodes are electrically disconnected from the first sensing pads and the second sensing pads. Adjacent adjusting electrodes are electrically connected through the third bridge line. The first sensing pads, the second sensing pads and the adjusting electrodes are made of a same patterned conductive layer.

23 Claims, 7 Drawing Sheets

TOUCH PANEL AND TOUCH DISPLAY PANEL

BACKGROUND OF THE INVENTION

1. Field of the Invention

The present disclosure relates to a touch panel and a touch display panel, and more particularly, to the touch panel and the touch display panel with low capacitive load.

2. Description of the Prior Art

Because of the intelligent characteristics of human-computer interaction, touch panels have replaced keyboards and have been widely applied to the external input interfaces of many instruments. In recent years, as the applications of electronic products have developed diversely, consumer electronics with the integration of the touch panels and display panels are commercialized a lot and have evolved flourishingly, for example, mobile phones, GPS (global positioning system) navigator systems, tablet personal computers (PCs) and laptop PCs.

Among the current diverse technologies of the touch panels, capacitive touch panels have become a mainstream technology in the mid-to-high-end consumer electronics owing to its outstanding features, such as high accuracy, multi-touch property, better endurance and high touch resolution.

Generally, touch display panels can be divided into several categories according to how touch devices integrate with the display panels. In the so-called out-cell type touch display panels, the touch devices are first produced on a substrate, and the substrate with the touch devices are then affixed on the outer surface of the display panel. In this case, the touch devices do not well coordinate with the display panel and the out-cell type touch display panels are the thickest. In the so-called on-cell type touch display panels, the touch devices are disposed directly outside of the display panel. In this case, the touch devices coordinate with the display panel more and the on-cell type touch display panels are thinner. In the so-called in-cell type touch display panels, the touch devices are disposed on an inner surface of the display panel. In this case, the touch devices coordinate with the display panel most and the in-cell type touch display panels are thinnest. Because the touch devices are directly formed on the inner surface of the display panel in the in-cell type capacitive touch display panels, the distance between sensing pads of the touch panel and common electrodes of the display panel is shorter, and the capacitive load between the sensing pads and the common electrodes is greater. Moreover, the sensing pads are employed to detect the capacitance variation between the touch points in the mechanism of the capacitive touch panels, and the exact positions of the touch points are determined according to the capacitance variation. If the capacitive load between the sensing pads and the common electrodes exceeds a limit, the capacitance variation detected by the sensing pads may be affected so that both the touch sensitivity and the accuracy deteriorate.

SUMMARY OF THE INVENTION

It is one of the objectives of the disclosure to provide a touch panel and a touch display panel so as to reduce the capacitive load between sensing pads and common electrodes, thereby enhancing the touch sensitivity and promoting the accuracy.

An embodiment of the disclosure provides a touch display panel. The touch display panel includes a first substrate, a first patterned conductive layer, a first insulation layer, a second patterned conductive layer, a second insulation layer, a second substrate, a common electrode and a display media layer. The first surface has a sensing region and a peripheral region. The first patterned conductive layer is disposed in the sensing region of the first substrate. The first patterned conductive layer includes a plurality of first sensing pads, a plurality of first bridge lines, a plurality of second sensing pads and a plurality of adjusting electrodes. Each of the first sensing pads has a first opening. The first bridge lines are disposed between the first sensing pads adjacent to each other. The first sensing pads and the first bridge lines are alternately aligned along a first direction, and the first sensing pads and the first bridge lines are electrically connected to each other. Each of the second sensing pads has a second opening. The adjusting electrodes are respectively disposed in the first openings and the second openings. The adjusting electrodes are not electrically connected to the first sensing pads and the second sensing pads. The first insulation layer covers the first patterned conductive layer. The second patterned conductive layer is disposed on the first insulation layer. The second patterned conductive layer includes a plurality of second bridge lines and a plurality of third bridge lines. The second bridge lines are respectively disposed between the second sensing pads adjacent to each other. The second sensing pads and the second bridge lines are alternately aligned along a second direction, and the second sensing pads and the second bridge lines are electrically connected to each other. The third bridge lines are respectively disposed between the adjusting electrodes adjacent to each other. The adjusting electrodes adjacent to each other are electrically connected to each other through the third bridge lines. The second insulation layer covers the second patterned conductive layer, the first insulation layer and the first patterned conductive layer. The second substrate faces the first substrate. The common electrode is disposed between the second insulation layer and the second substrate. The display media layer is disposed between the first substrate and the second substrate.

Another embodiment of the disclosure provides a touch panel, which is adapted to a touch display panel. The touch panel includes a substrate, a first patterned conductive layer and a second patterned conductive layer. The substrate has a sensing region and a peripheral region. The first patterned conductive layer is disposed in the sensing region of the substrate. The first patterned conductive layer includes a plurality of first sensing pads, a plurality of first bridge lines, a plurality of second sensing pads and a plurality of adjusting electrodes. Each of the first sensing pads has a first opening. The first bridge lines are respectively disposed between the first sensing pads adjacent to each other. The first sensing pads and the first bridge lines are alternately aligned along a first direction, and the first sensing pads and the first bridge lines are electrically connected to each other. Each of the second sensing pads has a second opening. The adjusting electrodes are respectively disposed in the first openings and the second openings. The adjusting electrodes are not electrically connected to the first sensing pads and the second sensing pads. The second patterned conductive layer is disposed on the substrate. The second patterned conductive layer includes a plurality of second bridge lines and a plurality of third bridge lines. The second bridge lines are respectively disposed between the second sensing pads adjacent to each other. The second sensing pads and the second bridge lines are alternately aligned along a second direction, and the second sensing pads and the second bridge lines are electrically connected to each other. The third bridge lines are respectively disposed between the adjusting electrodes adjacent to each other. The adjusting electrodes adjacent to each other are electrically connected to each other through the third bridge lines.

Another embodiment of the disclosure provides a touch pane. The touch panel includes a substrate, a plurality of first sensing pads, a plurality of first bridge lines, a plurality of second sensing pads, a plurality of adjusting electrodes, a plurality of second bridge lines and a plurality of third bridge lines. The substrate has a sensing region and a peripheral region. The first sensing pads are disposed in the sensing region of the substrate. Each of the first sensing pads has a first opening. The first bridge lines are disposed in the sensing region of the substrate and respectively disposed between the first sensing pads adjacent to each other. The first sensing pads and the first bridge lines are alternately aligned along a first direction, and the first sensing pads and the first bridge lines are electrically connected to each other. The second sensing pads are disposed in the sensing region of the substrate. Each of the second sensing pads has a second opening. The adjusting electrodes are disposed in the sensing region of the substrate and respectively disposed in the first openings and the second openings. The adjusting electrodes are not electrically connected to the first sensing pads and the second sensing pads. The second bridge lines are disposed in the sensing region of the substrate and respectively disposed between the second sensing pads adjacent to each other. The second sensing pads and the second bridge lines are alternately aligned along a second direction, and the second sensing pads and the second bridge lines are electrically connected to each other. The third bridge lines are disposed in the sensing region of the substrate and respectively disposed between the adjusting electrodes adjacent to each other. The adjusting electrodes adjacent to each other are electrically connected to each other through the third bridge lines. The first sensing pads, the second sensing pads and the adjusting electrodes are formed from one patterned conductive layer.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present disclosure, features of the embodiments will be made in detail. The embodiments of the present disclosure are illustrated in the accompanying drawings with numbered elements. In addition, the terms such as "first" and "second" described in the present disclosure are used to distinguish different components or processes, which do not limit the sequence of the components or processes.

Figure 1:
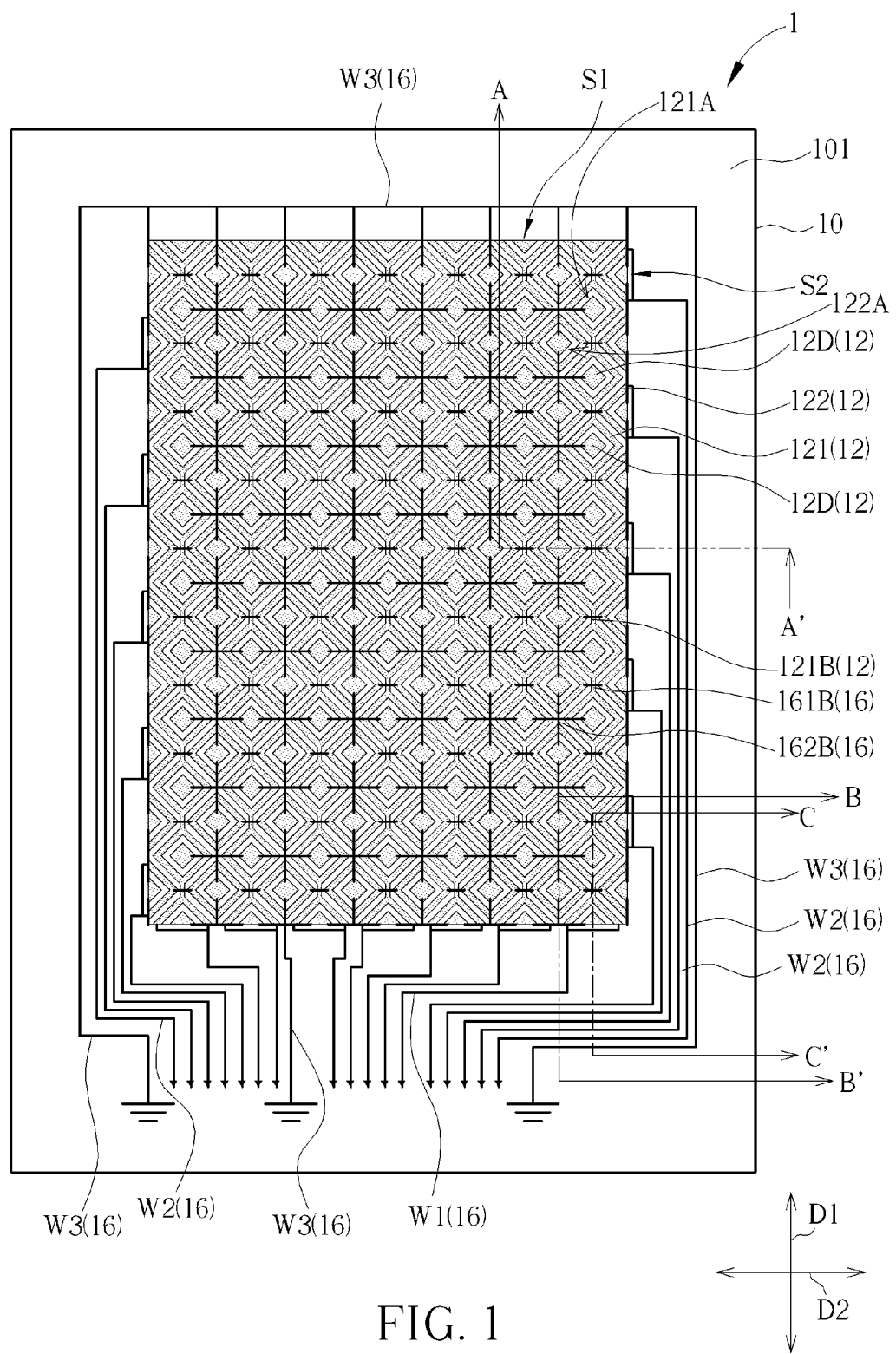
FIG. 1 is a schematic diagram illustrating a touch display panel according to a first embodiment of the present disclosure.
Figure 2:
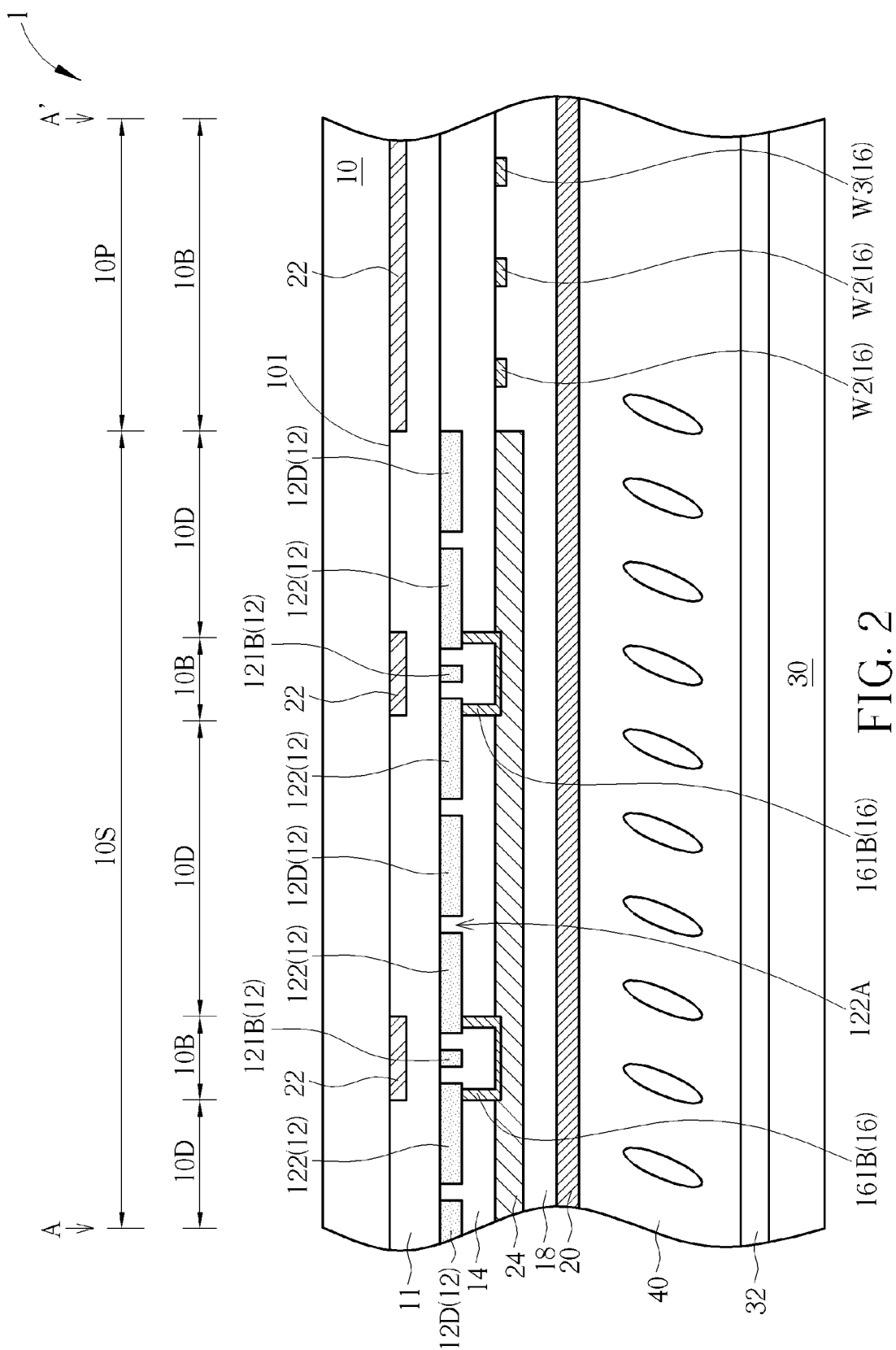
FIG. 2 is a cross-sectional view diagram taken along a cross-sectional line A-A' in FIG. 1.
Figure 3:
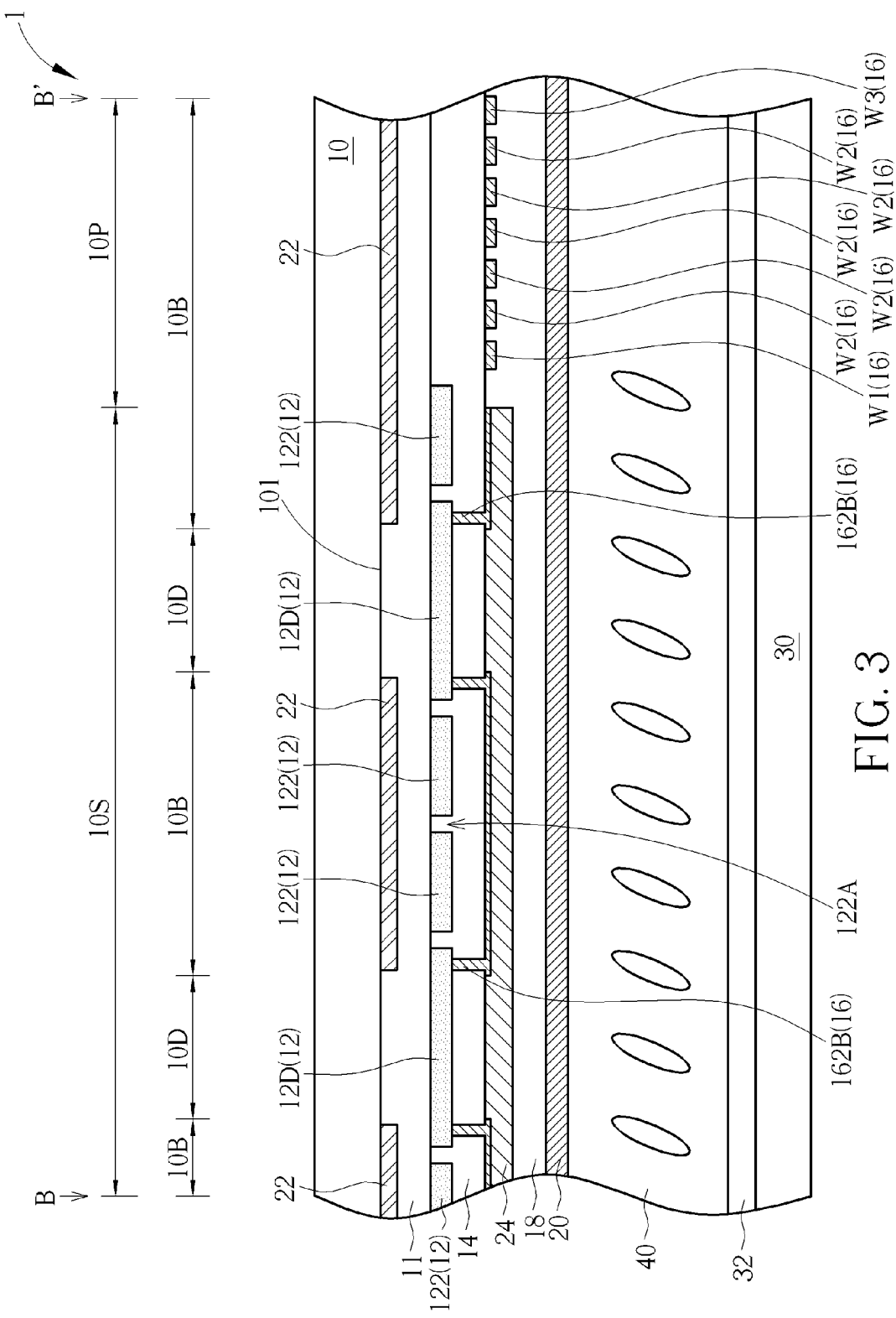
FIG. 3 is a cross-sectional view diagram taken along a cross-sectional line B-B' in FIG. 1.
Figure 4:
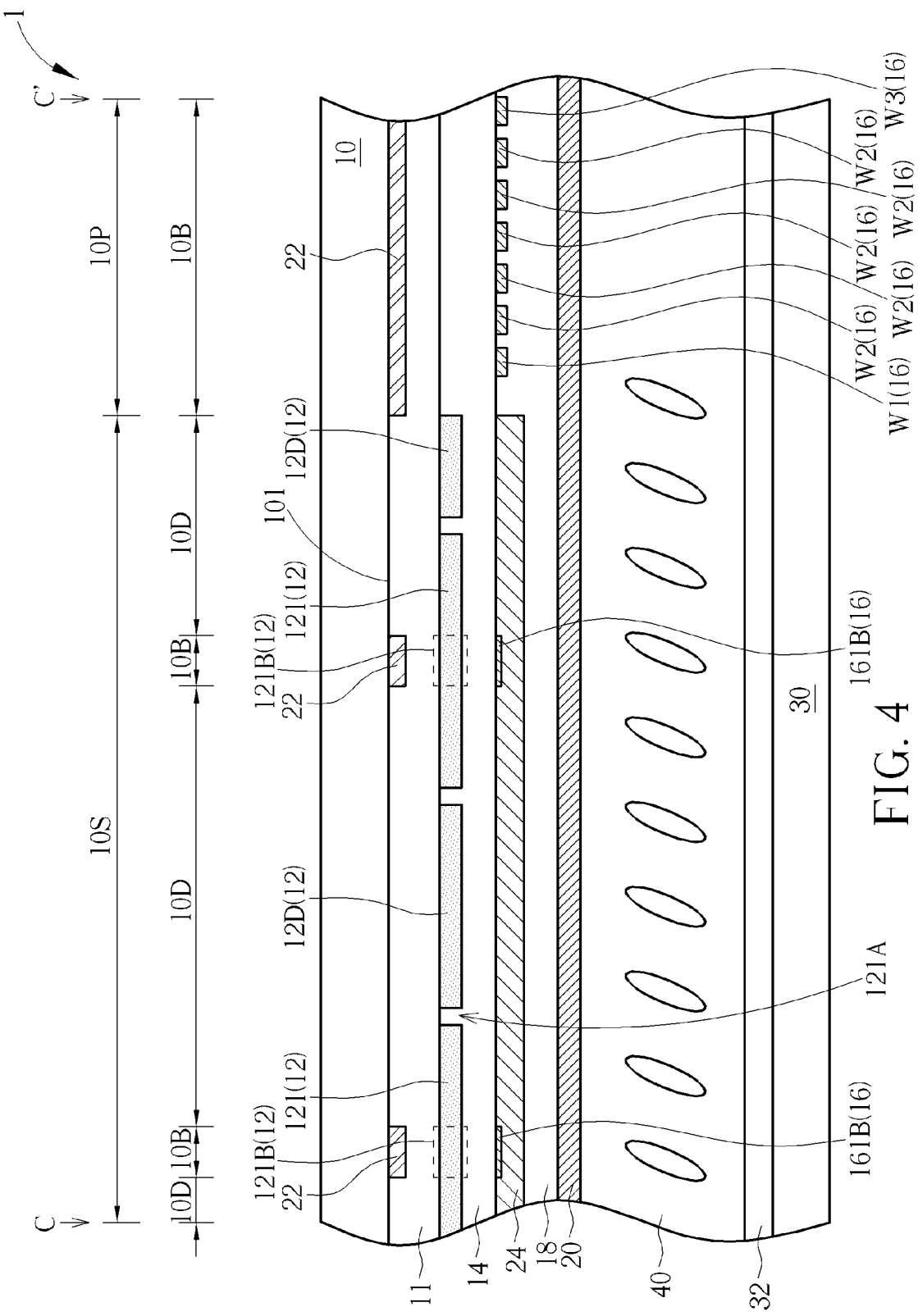
FIG. 4 is a cross-sectional view diagram taken along a cross-sectional line C-C' in FIG. 1.
Figure 5:
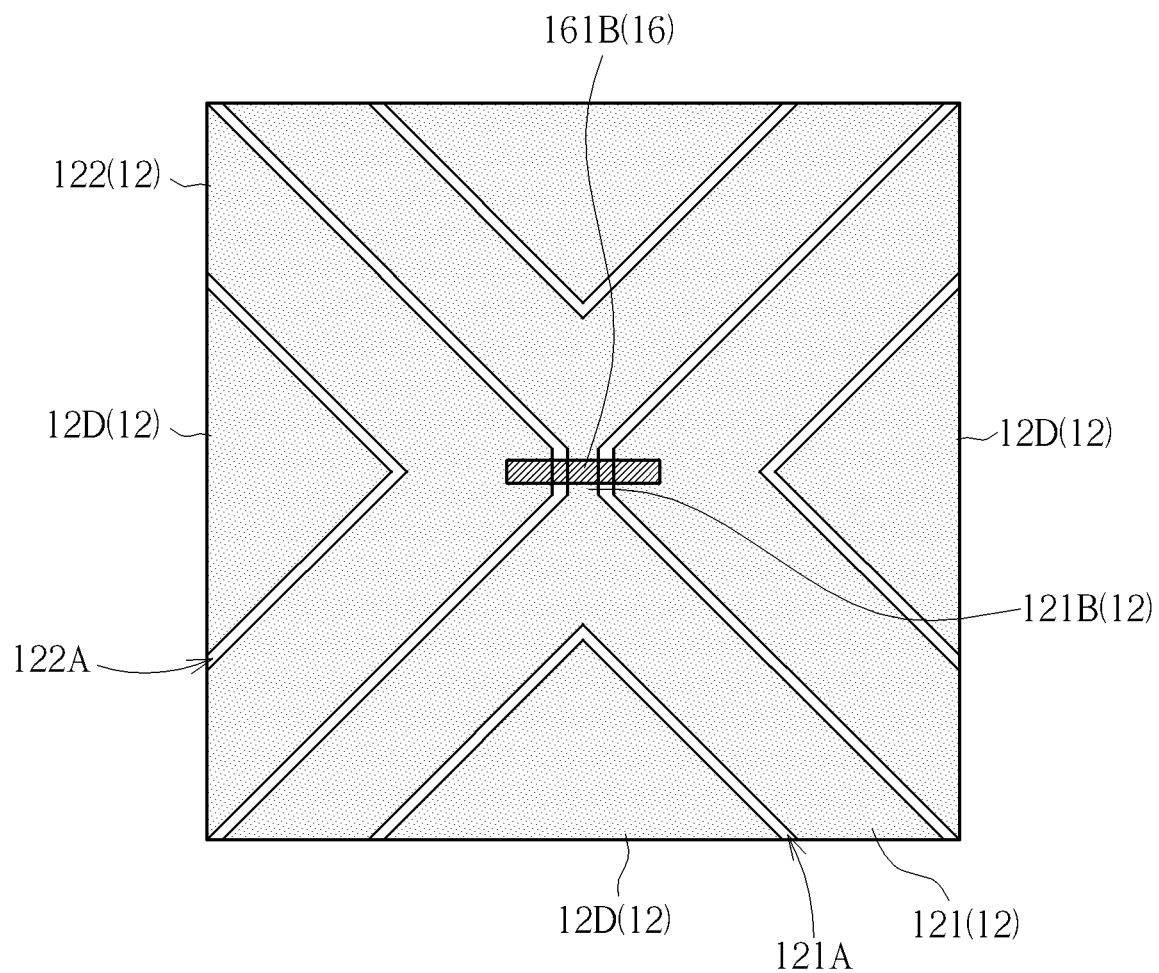
FIG. 5 is a schematic diagram illustrating a locally enlarged view of the touch display panel with first sensing pads, second sensing pads, first bridge lines, second bridge lines and adjusting electrodes according to the first embodiment.

Please refer to FIGS. 1-5. FIG. 1 is a schematic diagram illustrating a touch display panel according to a first embodiment of the present disclosure. FIG. 2 is a cross-sectional view diagram taken along a cross-sectional line A-A' in FIG. 1. FIG. 3 is a cross-sectional view diagram taken along a cross-sectional line B-B' in FIG. 1. FIG. 4 is a cross-sectional view diagram taken along a cross-sectional line C-C' in FIG. 1. FIG. 5 is a schematic diagram illustrating a locally enlarged view of the touch display panel with first sensing pads, second sensing pads, first bridge lines, second bridge lines and adjusting electrodes according to the first embodiment. To focus on the features of the touch display panel in this embodiment, FIG. 1 only shows a top view diagram of the touch panel of the touch display panel according to the first embodiment of the present disclosure. As shown in FIGS. 1-5, the touch display panel 1 in this embodiment includes a first substrate 10, a first patterned conductive layer 12, a first insulation layer 14, a second patterned conductive layer 16, a second insulation layer 18, a common electrode 20, a second substrate 30 and a display media layer 40. The first substrate 10 may include a transparent substrate, inter alia, a glass substrate or a plastic substrate. The first substrate 10 has a sensing region 10S and a peripheral region 10P. The first patterned conductive layer 12 is disposed in the sensing region 10S of the first substrate 10. In this embodiment, the first patterned conductive layer 12 comprises a patterned transparent conductive layer. The material of the patterned transparent conductive layer may include, for example but not limited to, indium tin oxide (ITO), indium zinc oxide (IZO) or other kinds of transparent conductive materials with high light transmittance and excellent conductivity. The first patterned conductive layer 12 includes a plurality of first sensing pads 121, a plurality of first bridge lines 121B, a plurality of second sensing pads 122 and a plurality of adjusting electrodes 12D. Each of the first sensing pads 121 has at least one first opening 121A. The first bridge lines 121B are respectively disposed between the first sensing pads 121 adjacent to each other. The first sensing pads 121 and the first bridge lines 121B are alternately aligned along a first direction D1, and the first sensing pads 121 and the first bridge lines 121B are electrically connected to each other. Each of the second sensing pads 122 has at least one second opening 122A. The adjusting electrodes 12D are respectively disposed in the first openings 121A and the second openings 122A. The adjusting electrodes 12D are not electrically connected to the first sensing pads 121 and the second sensing pads 122. The adjusting electrodes 12D are preferably disposed in center regions of the first sensing pads 121 and center regions of the second sensing pads 122 respectively, but not limited thereto. The first sensing pads 121 and the second sensing pads 122 may be, for example, diamond sensing pads, but the shape is not limited thereto. The length of the first sensing pads 121 and the second sensing pads 122 may be, for example, 4900 micrometers, but not limited thereto. In this embodiment, the distance between each of the first sensing pads 121 and the second sensing pad 122 adjacent to first sensing pad 121 is preferably fixed. For example, the distance between each of the first sensing pads 121 and the second sensing pad 122 adjacent to first sensing pad 121 may be 20 micrometers, but not limited thereto. The first openings 121A and the second openings 122A are closed openings respectively, inter alia, diamond openings. The shape of the first openings 121A and the second openings 122A may be other geometrical shapes, such as a rectangle, a circle or a polygon, but not limited thereto. Each of the first sensing pads 121 may have a plurality of first openings 121A, and each of the second sensing pads 122 may have a plurality of second openings 122A. The gap between each of the adjusting electrodes 12D and the first sensing pad 121 corresponding to the adjusting electrode 12D preferably has a fixed width. The gap between each of the adjusting electrodes 12D and the second sensing pad 122 corresponding to adjusting electrode 12D preferably a has a fixed width. For example, the gap between each of the adjusting electrodes 12D and the first sensing pad 121 corresponding to the adjusting electrode 12D may be 20 micrometers, but not limited thereto. The gap between each of the adjusting electrodes 12D and the second sensing pad 122 corresponding to adjusting electrode 12D may be 20 micrometers, but not limited thereto. The shape and the size of the first openings 121A and the second openings 122A are preferably identical, but not limited thereto. The shape and the size of all the adjusting electrodes 12D are preferably identical, but not limited thereto.

The touch display panel 1 of this embodiment may be a mutual capacitance touch display panel. Each of the first sensing pads 121 and each of the second sensing pads 122 comprise a driving electrode and a sensing electrode respectively. For example, the first sensing pads 121 may be the driving electrodes while the second sensing pads 122 are the sensing electrodes, but not limited thereto. In a variant embodiment, the first sensing pads 121 may be the sensing electrodes while the second sensing pads 122 are the driving electrodes. In another variant embodiment, the touch display panel may be a self capacitance touch display panel. In this case, the first sensing pads 121 and the second sensing pads 122 are the sensing electrodes. The first insulation layer 14 covers the first patterned conductive layer 12. The first insulation layer 14 may include an organic insulation layer, such as acrylic materials, or an inorganic insulation layer, such as silicon oxide, silicon nitride or silicon oxynitride, but not limited thereto. The first insulation layer 14 partially exposes the second sensing pads 122 and the adjusting electrodes 12D.

The second patterned conductive layer 16 is disposed on the first insulation layer 14. In this embodiment, the second patterned conductive layer 16 includes a patterned metal layer. The material of the patterned metal layer may comprise, for example but not limited to, molybdenum (Mo), Mo/Al/Mo (i.e., three-layer stacked structures with molybdenum (Mo), aluminum (Al) and molybdenum (Mo) disposed in that order) and other pure metal materials or composite metal materials with excellent conductivity. The material of the second patterned conductive layer 16 may also include non-metal materials, alloys or other materials with excellent conductivity. In a variant embodiment, the second patterned conductive layer 16 may also be a patterned transparent conductive layer. The second patterned conductive layer 16 includes a plurality of second bridge lines 161B and a plurality of third bridge lines 162B. The second bridge lines 161B are respectively disposed between the second sensing pads 122 adjacent to each other. The second sensing pads 122 and the second bridge lines 161B are alternately aligned along a second direction D2. The second bridge lines 161B are electrically connected to the adjacent second sensing pads 122 exposed by the first insulation layer 14. The third bridge lines 162B are respectively disposed between the adjusting electrodes 12D adjacent to each other. The third bridge lines 162B are electrically connected to the adjacent adjusting electrodes 12D exposed by the first insulation layer 14. In a variant embodiment, the locations of the first patterned conductive layer 12 and the second patterned conductive layer 16 can be exchanged. In other words, the first insulation layer 14 covers the second patterned conductive layer 16. The first patterned conductive layer 12 is disposed on the first insulation layer 14.

Each of the first sensing pads 121 and the first bridge lines 121B electrically connected to the first sensing pad 121 along the first direction D1 and the first sensing pads 121 electrically connected to the first sensing pad 121 along the first direction D1 constitute a first sensing series S1. Each of the second sensing pads 122 and the second bridge lines 161B electrically connected to the second sensing pad 122 along the second direction D2 and the second sensing pads 122 electrically connected to the second sensing pad 122 along the second direction D2 constitute a second sensing series S2. The second insulation layer 18 covers the second patterned conductive layer 16, the first insulation layer 14 and the first patterned conductive layer 12. The second insulation layer 18 may include an organic insulation layer, such as acrylic materials, or an inorganic insulation layer, such as silicon oxide, silicon nitride or silicon oxynitride, but not limited thereto. The second substrate 30 faces the first substrate 10. The second substrate 30 may include a transparent substrate, inter alia, a glass substrate or a plastic substrate. The display media layer 40 is disposed between the first substrate 10 and the second substrate 30. The display media layer 40 may include a liquid crystal layer; however, according to the type of the display panel, the display media layer 40 may include other kinds of display media layers, such as an organic luminescent material layer, a reflective electrophoretic material layer or an electro-wetting material layer, but not limited thereto. The common electrode 20 serves as the common electrode of the display panel. The common electrode 20 can be disposed between the second insulation layer 18 and the second substrate 30 of the first substrate 10. The common electrode 20 may be a transparent conductive layer. In a variant embodiment, the second patterned conductive layer 16 may also include a patterned metal layer. The material of the patterned metal layer may comprise, for example but not limited to, molybdenum (Mo), Mo/Al/Mo (i.e., three-layer stacked structures with molybdenum (Mo), aluminum (Al) and molybdenum (Mo) disposed in that order) and other pure metal materials or composite metal materials with excellent conductivity. The material of the second patterned conductive layer 16 may also include non-metal materials, alloys or other materials with excellent conductivity. In another variant embodiment, the second patterned conductive layer 16 may also be a composite layer of transparent conductive layers and patterned metal layers.

The touch display panel 1 in this embodiment is exemplarily embodied as a capacitive touch liquid crystal display panel. In other words, a capacitive touch panel is integrated in a liquid crystal display panel. The touch display panel 1 in this embodiment is preferably an in-cell touch display panel. That is to say, the capacitive touch panel is disposed on the inner surface 101 of the first substrate 10 (also referred to as an opposing substrate or a color filter substrate) in the liquid crystal display panel. The inner surface 101 faces the second substrate 30 (also referred to as an array substrate or a thin-film transistor substrate). The first patterned conductive layer 12, the first insulation layer 14, the second patterned conductive tive layer 16, the second insulation layer 18 and the common electrode 20 are disposed on the inner surface 101 of the first substrate 10. The first substrate 10 may include a plurality of display regions 10D arranged in an array and a plurality of light-shielding regions 10B disposed in the peripheral region 10P and between the display regions 10D. The touch display panel 1 may further include a black matrix 22 and a color filter layer 24. The black matrix 22 overlaps the light-shielding regions 10B. The color filter layer 24 overlaps the display regions 10D. In this embodiment, the display regions 10D mean the areas, such as sub-pixel regions, aligned in an array to display images. The light-shielding regions 10B mean the areas preventing display interruption between the display regions 10D, and, for example, the areas may be covered by the black matrix 22 and other devices impermeable to light, such as metal wires. The color filter layer 24 overlaps the display regions 10D and may further partially overlap the light-shielding regions 10B. FIGS. 2-4 are simply schematic diagrams, the display regions 10D may also include a plurality of light-shielding regions 10B (not shown). Since the function and the arrangement of the display regions 10D and the light-shielding regions 10B mentioned above are well known to those skilled in the art, they are not redundantly described. The black matrix 22 is preferably disposed on the first substrate 10. The touch display panel 1 may further comprise a protective layer 11 disposed between the black matrix 22 and the first patterned conductive layer 12. The protective layer 11 may comprise inorganic insulation materials or organic insulation materials; moreover, the material of the protective layer 11, preferably, can be leveled to a desired flatness and may include, for example but not limited to, polyimide. The touch display panel 1 may further include a display device 32 disposed on the second substrate 30. The display device 32 may comprise a gate line, a data line, an active switching device, a pixel electrode, a storage capacitor, an alignment film and other required display devices for the touch display panel 1. Since the function and the arrangement of the display device 32 are well known to those skilled in the art, they are not redundantly described. Additionally, the touch display panel 1 may further include two polarizers (not shown) respectively disposed on the outer surface of the first substrate 10 and the outer surface of the second substrate 30. The touch display panel 1 may be integrated with a backlight module (not shown) to form the touch display panel. As shown in FIGS. 2-4, the touch display panel 1 generally may be divided into a touch panel and a display panel; moreover, the touch panel and the display panel share the first substrate 10. The touch panel includes the first patterned conductive layer 12, the first insulation layer 14, the second patterned conductive layer 16 and other devices; the display panel includes the common electrode 20, the second substrate 30, the black matrix 22, the color filter layer 24, the display media layer 40, the display device 32 and other devices. As shown in FIG. 2, the common electrode 20 may be disposed on the second insulation layer 18 of the first substrate 10. In this case, the common electrode 20 and the pixel electrodes of the display device 32 generate a vertical electric field so as to drive, for example, twist nematic (TN) liquid crystal molecules and vertical alignment (VA) liquid crystal molecules, but not limited thereto.

The second patterned conductive layer 16 may further comprise a plurality of first wires W1, a plurality of second wires W2 and at leas one third wire W3. The first wires W1 are disposed in the peripheral region 10P of the first substrate 10. The first wires W1 are respectively electrically connected to the first sensing series S1 so as to provide driving signals for the first sensing series S1. The second wires W2 are disposed in the peripheral region 10P of the first substrate 10. The second wires W2 are respectively electrically connected to the second sensing series S2 so as to receive sensing signals from the second sensing series S2. The third wire W3 is disposed in the peripheral region 10P of the first substrate 10. The third wire W3 is electrically connected to the adjusting electrodes 12D and the third bridge lines 162B so that the adjusting electrodes 12D are electrically connected to a fixed voltage or are grounded through the third wire W3. Because the adjusting electrodes 12D are electrically connected to a fixed voltage or are grounded, and because the adjusting electrodes 12D are not electrically connected to the first sensing pads 121 and the second sensing pads 122, capacitive loads between the first sensing pads 121 and the common electrode 20 and between the second sensing pads 122 and the common electrode 20 decrease with the adjusting electrodes 12D disposed. As a result, the touch sensitivity is enhanced and the accuracy is promoted. The first sensing pads 121, the second sensing pads 122 and the adjusting electrodes 12D are preferably coplanar. For example, the first sensing pads 121, the second sensing pads 122 and the adjusting electrodes 12D are all formed from the first patterned conductive layer 12. In this way, the capacitive loads can be further reduced, thereby enhancing the touch sensitivity and promoting the accuracy. Here, when a finger touches down the touch panel, the capacitance between the first sensing pads 121 and the second sensing pads 122 is defined as an input capacitance. When the finger touches down and then is lifted up off the touch panel, the capacitance between the first sensing pads 121 and the second sensing pads 122 is defined as an output capacitance. The area ratio of an area of the adjusting electrode 12D to a sum of an area of the first sensing pad 121 and the area of the adjusting electrode 12D may be modified according to the difference between the input capacitance and the output capacitance. The area ratio of the area of the adjusting electrode 12D to a sum of an area of the second sensing pad 122 and the area of the adjusting electrode 12D may be modified according to the difference between the input capacitance and the output capacitance. More specifically speaking, both the input capacitance and the output capacitance are not dramatically affected by the adjusting electrodes 12D disposed, thereby reducing the capacitive loads, enhancing the touch sensitivity and promoting the accuracy. In this embodiment, the area ratio of the area of the adjusting electrode 12D to the sum of the area of the first sensing pad 121 and the area of the adjusting electrode 12D is substantially in a range between 1% and 99%. The area ratio of the area of the adjusting electrode 12D to the sum of the area of the second sensing pad 122 and the area of the adjusting electrode 12D is substantially in a range between 1% and 99%, preferably between 10% and 90% and more preferably between 20% and 70%. For example, the area ratio of the area of the adjusting electrode 12D to the sum of the area of the first sensing pad 121 and the area of the adjusting electrode 12D is substantially 33%. The area ratio of the area of the adjusting electrode 12D to the sum of the area of the second sensing pad 122 and the area of the adjusting electrode 12D is substantially 33%. However, the present disclosure is not limited to this—with the suitable relative ratio of the adjusting electrodes 12D of the present disclosure, not only the input capacitance and the output capacitance but also the ratio of the capacitive loads can be appropriately modified, thereby enhancing the touch sensitivity and promoting the accuracy.

In addition, the first wires W1, the second wires W2 and the third wire W3 may be formed from the same patterned conductive layer, for example but not limited to, the second patterned conductive layer 16. However, the first wires W1, the second wires W2 and the third wire W3 may be formed from different patterned conductive layers so as to shorten the distance among the first wires W1, the second wires W2 and the third wire W3, and therefore the area of the peripheral region 10P shrinks.

In this embodiment, the first sensing pads 121, the first bridge lines 121B, the second sensing pads 122 and the adjusting electrodes 12D are a portion of the first patterned conductive layer 12. The second bridge lines 161B and the third bridge lines 162B are a portion of the second patterned conductive layer 16. In this case, the first patterned conductive layer 12 is a patterned transparent conductive layer and the second patterned conductive layer 16 is a patterned metal conductive layer, but not limited thereto. For example, in a variant embodiment, the first bridge lines 121B may be formed from another patterned metal conductive layer. In other words, the first bridge lines 121B, the second bridge lines 161B and the third bridge lines 162B are metal bridge lines. Nevertheless, since the first bridge lines 121B and the second bridge lines 161B intersect, the first bridge lines 121B and the second bridge lines 161B are formed from different patterned metal conductive layers. Since neither the first bridge lines 121B nor the second bridge lines 161B intersect with the third bridge lines 162B, the third bridge lines 162B may be alternatively formed from the same patterned conductive layer as either the first bridge lines 121B or the second bridge lines 161B is.

In the following paragraph, the touch panel with the adjusting electrodes disclosed in this embodiment is compared with a touch panel without the adjusting electrodes in a comparative embodiment so as to illustrate the function of the adjusting electrodes.

An Experimental Embodiment

The test results are based on a 10.1-inch touch panel of the preceding embodiments of the present disclosure. The first sensing pads 121 and the second sensing pads 122 are, for example, square as shown in FIG. 5. The side length of the first sensing pads 121 and the second sensing pads 122 is, for example, 4900 micrometers. The area of the adjusting electrode 12D is, for example, 33% of the sum of the area of the first sensing pad 121 and the area of the adjusting electrode 12D. The area of the adjusting electrode 12D is, for example, 33% of the sum of the area of the second sensing pad 122 and the area of the adjusting electrode 12D. The distance between each of the first sensing pads 121 and the second sensing pad 122 adjacent to the first sensing pad 121 is, for example, 20 micrometers. The gap between each of the adjusting electrodes 12D and the first sensing pad 121 adjacent to the adjusting electrode 12D is, for example, 20 micrometers. The gap between each of the adjusting electrodes 12D and the second sensing pad 122 adjacent to the adjusting electrode 12D is, for example, 20 micrometers. The common electrode 20 is, for example, disposed on the second insulation layer 18 as shown in FIG. 2. For example, if the touch panel is driven in a mutual capacitance sensing approach, the first sensing pads 121 will serve as the driving electrode (Tx) and the second sensing pads 122 will serve as the sensing electrode (Rx). When the touch panel is driven, mutual capacitance between the first sensing pads 121 and the second sensing pads 122 is 1.121 pico-farad (pf). When the finger touches down and then is lifted up off the touch panel, the capacitance variation between the first sensing pads 121 and the second sensing pads 122 is 0.113 pf. The touch signal ratio is 10% (0.113 pf/1.121 pf=10%), which is still distinguishable for touch-driven sensing integrated circuits (IC). In this case, the capacitive load between the first sensing pads 121 and the common electrode 20 is 1380 pf. The capacitive load between the second sensing pads 122 and the common electrode 20 is 860 pf.

A Comparative Embodiment

The test results are also based on a 10.1-inch touch panel of the comparative embodiment. No adjusting electrode is disposed in the first sensing pads 121 and the second sensing pads 122. The first sensing pads 121 and the second sensing pads 122 are also square. The side length of the first sensing pads 121 and the second sensing pads 122 is also 4900 micrometers. In other words, the area of the adjusting electrode 12D is 0% of the sum of the area of the first sensing pad 121 and the area of the adjusting electrode 12D. The area of the adjusting electrode 12D is 0% of the sum of the area of the second sensing pad 122 and the area of the adjusting electrode 12D. The distance between each of the first sensing pads 121 and the second sensing pad 122 adjacent to the first sensing pad 121 is also 20 micrometers. The common electrode 20 is, for example, disposed on the second insulation layer 18 as shown in FIG. 2. The touch panel is also driven in the mutual capacitance sensing approach. The first sensing pads 121 serves as the driving electrode (Tx) and the second sensing pads 122 serves as the sensing electrode (Rx). When the touch panel is driven, mutual capacitance between the first sensing pads 121 and the second sensing pads 122 is 1.182 pf. When the finger touches down and then is lifted up off the touch panel, the capacitance variation between the first sensing pads 121 and the second sensing pads 122 is 0.176 pf. In this case, the capacitive load between the first sensing pads 121 and the common electrode 20 is 2240 pf. The capacitive load between the second sensing pads 122 and the common electrode 20 is 1400 pf.

From the embodiment of the present disclosure and the comparative embodiment, it is obvious that because of the adjusting electrodes 12D, both the capacitive load between the first sensing pads 121 and the common electrode 20 and the capacitive load between the second sensing pads 122 and the common electrode 20 drop dramatically in the present disclosure. The capacitive load between the first sensing pads 121 and the common electrode 20 falls 38.4% (2240 pf−1380 pf/2240 pf=38.4%). The capacitive load between the second sensing pads 122 and the common electrode 20 falls 38.6% (1400 pf−860 pf/1400 pf=38.6%). Therefore, because of the adjusting electrodes 12D in the present disclosure, the capacitive loads are reduced significantly, the signal-noise ratio (SNR) relatively increases, and the required electricity for the touch-driven sensing integrated circuits is saved.

The touch display panels and the touch panels are not restricted to the preceding embodiments in the present disclosure. Other embodiments or modifications will be detailed in the following description. In order to simplify and show the differences or modifications between the following embodiments and the above-mentioned embodiment, the same numerals denote the same components in the following description, and the similar parts are not detailed redundantly.

Figure 6:
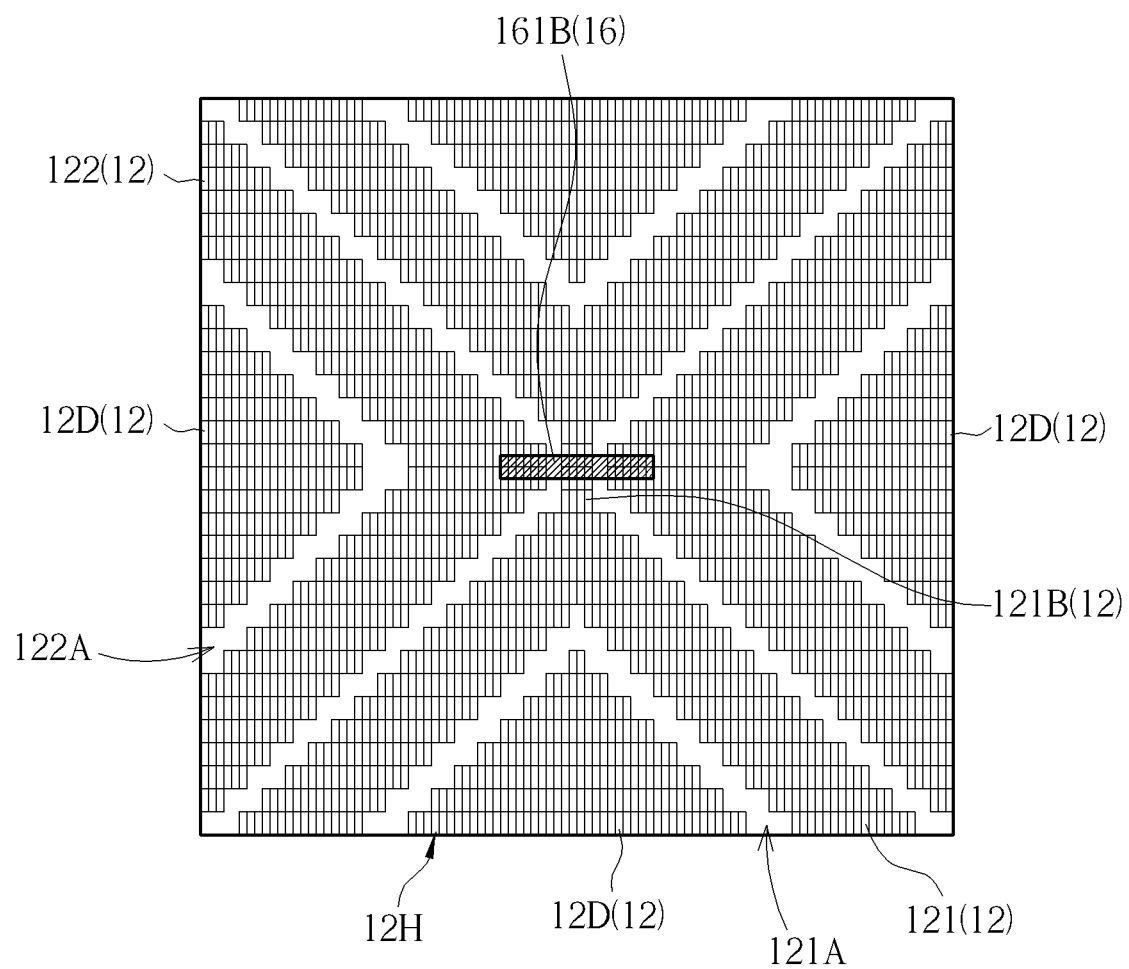
FIG. 6 is a schematic diagram illustrating a locally enlarged view of a touch display panel with the first sensing pads, the second sensing pads, the first bridge lines, the second bridge lines and the adjusting electrodes according to a second embodiment of the present disclosure.

Please refer to FIG. 6 and also refer to FIGS. 1-4. FIG. 6 is a schematic diagram illustrating a locally enlarged view of a touch display panel with the first sensing pads, the second sensing pads, the first bridge lines, the second bridge lines and the adjusting electrodes according to a second embodiment of the present disclosure. As shown in FIG. 6, compared with the first embodiment, the first patterned conductive layer 12 in this embodiment includes a patterned metal conductive layer corresponding to the light-shielding regions (as shown in FIGS. 2-4). The first sensing pads 121, the second sensing pads 122 and the adjusting electrodes 12D may respectively comprise metal meshed electrodes or composite layers of the above-mentioned patterned transparent conductive layers and the metal meshed electrodes. The metal meshed electrodes have a plurality of holes 12H corresponding to the display regions (as shown in FIGS. 2-4). Generally, the first sensing pads 121, the second sensing pads 122 and the adjusting electrodes 12D are larger than a single display region 10D. Therefore, each of the first sensing pads 121, each of the second sensing pads 122 and each of the adjusting electrodes 12D correspond to a plurality of the display regions 10D and the light-shielding regions 10B therebetween. In this embodiment, because the adjusting electrodes 12D are electrically connected to a fixed voltage or are grounded, and because the adjusting electrodes 12D are not electrically connected to the first sensing pads 121 and the second sensing pads 122, both the capacitive load between the first sensing pads 121 and the common electrode 20 and the capacitive load between the second sensing pads 122 and the common electrode 20 drop with the adjusting electrodes 12D disposed. Accordingly, the touch sensitivity is enhanced and the accuracy is promoted.

Figure 7:
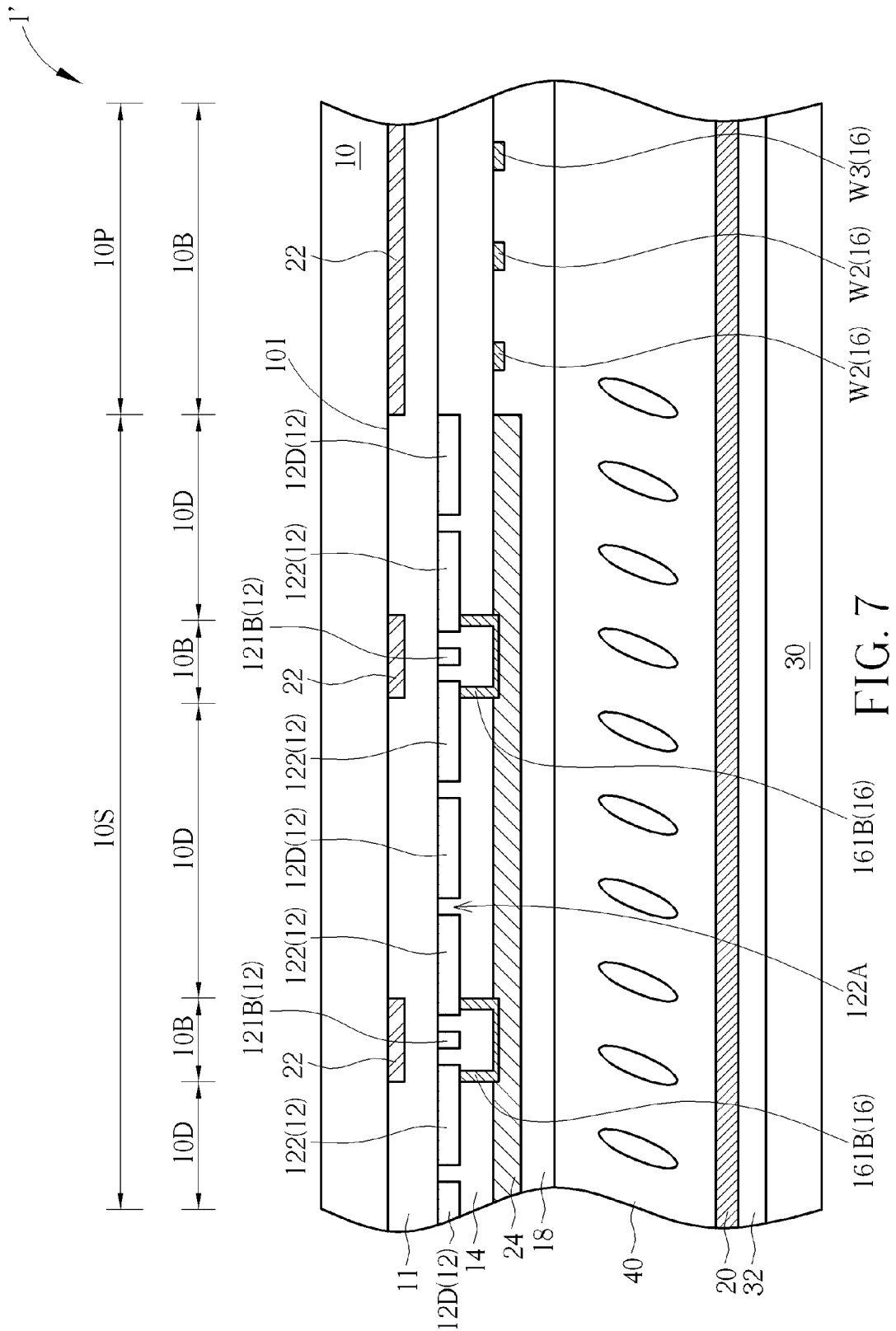
FIG. 7 is a schematic diagram illustrating a touch display panel according to a variant of the first embodiment of the present disclosure.

Please refer to FIG. 7. FIG. 7 is a schematic diagram illustrating a touch display panel according to a variant of the first embodiment of the present disclosure. As shown in FIG. 7, compared with the first embodiment, in the touch display panel 1' of the variant embodiment, the common electrode 20 is disposed on the second substrate 30. Moreover, the common electrode 20 may be integrated with the display device 32. For example, the common electrode 20 and the pixel electrodes of the display device 32 generate a horizontal electric field. Therefore, it can be applied to an in-plane switch (IPS) liquid crystal display panel and a fringe field switching (FFS) liquid crystal display panel, but not limited thereto. The common electrode 20 may be a single surface electrode or a mesh patterned electrode with slits or openings. The common electrode 20 may be an auxiliary electrode. For example, if the touch display panel is a capacitive touch organic light emitting diode (OLED) display panel, the common electrode 20 may be electrically connected to the cathode of the organic light emitting diode (OLED) display panel so as to promote the performance of the cathode. Since the arrangement of the common electrode mentioned above is well known to those skilled in the art, they are not redundantly described.

To sum up, in the touch display panels and the touch panels of the present disclosure, the adjusting electrodes are disposed in the first sensing pads and the second sensing pads. The adjusting electrodes are not electrically connected to the first sensing pads 121 and the second sensing pads 122. The adjusting electrodes are electrically connected to a fixed voltage or are grounded. With the grounded adjusting electrodes or the adjusting electrodes of a fixed voltage, both the capacitive load between the first sensing pads 121 and the common electrode 20 and the capacitive load between the second sensing pads 122 and the common electrode 20 can drop enormously while the capacitance between the first sensing pads and the second sensing pads remains. As a result, the touch sensitivity is enhanced and the accuracy is promoted. The first sensing pads 121, the second sensing pads 122 and the adjusting electrodes 12D are preferably coplanar and formed from the same conductive layer so as to further reduce the capacitive load, enhance the touch sensitivity and promote the accuracy. Furthermore, because the first sensing pads, the second sensing pads and the adjusting electrodes are formed from the same conductive layer, the fabrication processes can be simplified and the production cost decreases.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
a first substrate, having a sensing region and a peripheral region;
a plurality of first sensing pads, disposed in the sensing region of the first substrate, wherein each of the first sensing pads has a first opening;
a plurality of first bridge lines, disposed in the sensing region of the first substrate and respectively disposed between the first sensing pads adjacent to each other, wherein the first sensing pads and the first bridge lines are alternately aligned along a first direction, and the first sensing pads and the first bridge lines are electrically connected to each other;
a plurality of second sensing pads, disposed in the sensing region of the first substrate, wherein each of the second sensing pads has a second opening;
a plurality of adjusting electrodes, disposed in the sensing region of the first substrate and respectively disposed in the first openings and the second openings, wherein the adjusting electrodes are not electrically connected to the first sensing pads and the second sensing pads;
a plurality of second bridge lines, disposed in the sensing region of the first substrate and respectively disposed between the second sensing pads adjacent to each other, wherein the second sensing pads and the second bridge lines are alternately aligned along a second direction, and the second sensing pads and the second bridge lines are electrically connected to each other;
a plurality of third bridge lines, disposed in the sensing region of the first substrate and respectively disposed between the adjusting electrodes adjacent to each other, wherein the adjusting electrodes adjacent to each other are electrically connected to each other through the third bridge lines; and
wherein the first sensing pads, the second sensing pads and the adjusting electrodes are formed from a first patterned conductive layer.

2. The touch panel according to claim 1, wherein the first patterned conductive layer further comprises the first bridge lines.

3. The touch panel according to claim 1, wherein the first patterned conductive layer comprises a patterned transparent conductive layer.

4. The touch panel according to claim 1, wherein the first patterned conductive layer comprises a patterned metal conductive layer, and the first sensing pads, the second sensing pads and the adjusting electrodes respectively comprise a metallic meshed electrode.

5. The touch panel according to claim 1, wherein each of the first sensing pads and each of the second sensing pads comprise a driving electrode and a sensing electrode respectively.

6. The touch panel according to claim 1, wherein the first opening and the second opening are closed openings respectively, a gap between each of the adjusting electrodes and the first sensing pad corresponding to the adjusting electrode has a fixed width, and a gap between each of the adjusting electrodes and the second sensing pad corresponding to the adjusting electrode has a fixed width.

7. The touch panel according to claim 1, wherein a distance between each of the first sensing pads and the second sensing pad adjacent to the first sensing pad is fixed.

8. The touch panel according to claim 1, wherein an area ratio of an area of the adjusting electrode to a sum of an area of the first sensing pad and the area of the adjusting electrode is substantially in a range between 1% and 99%, and an area ratio of the area of the adjusting electrode to a sum of an area of the second sensing pad and the area of the adjusting electrode is substantially in a range between 1% and 99%.

9. The touch panel according to claim 1, wherein the first sensing pads and the first bridge lines electrically connected to the first sensing pads along the first direction constitute a plurality of first sensing series, and the second sensing pads and the second bridge lines electrically connected to the second sensing pads along the second direction constitute a plurality of second sensing series.

10. The touch panel according to claim 9, wherein the second bridge lines and the third bridge lines are formed from a second pattern conductive layer.

11. The touch panel according to claim 9, wherein the second patterned conductive layer further comprises:
a plurality of first wires, disposed in the peripheral region of the first substrate and respectively electrically connected to the first sensing series;
a plurality of second wires, disposed in the peripheral region of the first substrate and respectively electrically connected to the second sensing series; and
at least one third wire, disposed in the peripheral region of the first substrate and electrically connected to the adjusting electrodes and to the third bridge lines.

12. The touch panel according to claim 10, further comprising:
a first insulation layer disposed between the first patterned conductive layer and the second patterned conductive layer; and
a second insulation layer, covering the second patterned conductive layer, the first insulation layer and the first patterned conductive layer.

13. A touch display panel, comprising:
the touch panel according to claim 1;
a second substrate, facing the first substrate;
a common electrode, disposed on the second substrate; and
a display media layer, disposed between the first substrate and the second substrate.

14. The touch display panel according to claim 13, wherein the second bridge lines and the third bridge lines are formed from a second pattern conductive layer.

15. The touch display panel according to claim 13, further comprising:
a first insulation layer disposed between the first patterned conductive layer and the second patterned conductive layer; and
a second insulation layer, covering the second patterned conductive layer, the first insulation layer and the first patterned conductive layer.

16. The touch display panel according to claim 15, wherein the first substrate has an inner surface facing the second substrate, and the first patterned conductive layer, the first insulation layer, the second patterned conductive layer, the second insulation layer and the common electrode are disposed on the inner surface of the first substrate.

17. The touch display panel according to claim 15, wherein the first substrate comprises a plurality of display regions arranged in an array and a plurality of light-shielding regions arranged between the display regions.

18. The touch display panel according to claim 17, wherein the second patterned conductive layer comprises a patterned metal conductive layer, and the second patterned conductive layer overlaps the light-shielding regions.

19. The touch display panel according to claim 17, further comprising a black matrix overlapping the light-shielding regions.

20. The touch display panel according to claim 17, further comprising a color filter layer overlapping the display regions.

21. A touch panel, comprising:
a first substrate, having a sensing region and a peripheral region;
a plurality of first sensing pads, disposed in the sensing region of the first substrate, wherein each of the first sensing pads has a first through hole formed therein;
a plurality of first bridge lines, disposed in the sensing region of the first substrate and respectively disposed between the first sensing pads adjacent to each other, wherein the first sensing pads and the first bridge lines are electrically connected to each other;
a plurality of second sensing pads, disposed in the sensing region of the first substrate, wherein each of the second sensing pads has a second through hole formed therein;
a plurality of adjusting electrodes, disposed in the sensing region of the first substrate and respectively disposed in the first through holes and the second through holes so that a ring-shaped gap is formed to substantially surround one of the adjusting electrodes;
a plurality of second bridge lines, disposed in the sensing region of the first substrate and respectively disposed between the second sensing pads adjacent to each other, wherein the second sensing pads and the second bridge lines are electrically connected to each other; and
a plurality of third bridge lines, disposed in the sensing region of the first substrate and respectively disposed between the adjusting electrodes adjacent to each other, wherein the adjusting electrodes adjacent to each other are electrically connected to each other.

22. A touch panel, comprising:
a first substrate, having a sensing region and a peripheral region;
a plurality of first sensing pads, disposed in the sensing region of the first substrate, wherein each of the first sensing pads has a first opening;
a plurality of first bridge lines, disposed in the sensing region of the first substrate and respectively disposed between the first sensing pads adjacent to each other, wherein the first sensing pads and the first bridge lines are electrically connected to each other;
a plurality of second sensing pads, disposed in the sensing region of the first substrate, wherein each of the second sensing pads has a second opening;
a plurality of adjusting electrodes, disposed in the sensing region of the first substrate and respectively disposed in the first openings and the second openings, wherein the adjusting electrodes are not electrically connected to the first sensing pads and the second sensing pads, a perimeter of a pattern of each of the adjusting electrodes projected on the first substrate in a vertical projection direction is surrounded by a pattern of the first sensing pad or a pattern of the second sensing pad projected on the first substrate in the vertical projection direction;
a plurality of second bridge lines, disposed in the sensing region of the first substrate and respectively disposed between the second sensing pads adjacent to each other, wherein the second sensing pads and the second bridge lines are electrically connected to each other; and a plurality of third bridge lines, disposed in the sensing region of the first substrate and respectively disposed between the adjusting electrodes adjacent to each other, wherein the adjusting electrodes adjacent to each other are electrically connected to each other.

23. A touch panel, comprising:

a first substrate, having a sensing region and a peripheral region;

a plurality of first sensing pads, disposed in the sensing region of the first substrate, wherein each of the first sensing pads has a first opening;

a plurality of first bridge lines, disposed in the sensing region of the first substrate and respectively disposed between the first sensing pads adjacent to each other, wherein the first sensing pads and the first bridge lines are electrically connected to each other;

a plurality of second sensing pads, disposed in the sensing region of the first substrate, wherein each of the second sensing pads has a second opening;

a plurality of adjusting electrodes, disposed in the sensing region of the first substrate, wherein a pattern of each of the adjusting electrodes projected on the first substrate in a vertical projection direction is completely located within the first opening or the second opening, and the patterns of the adjusting electrodes projected on the first substrate in the vertical projection direction do not overlap the first sensing pads and the second sensing pads;

a plurality of second bridge lines, disposed in the sensing region of the first substrate and respectively disposed between the second sensing pads adjacent to each other, wherein the second sensing pads and the second bridge lines are electrically connected to each other; and a plurality of third bridge lines, disposed in the sensing region of the first substrate and respectively disposed between the adjusting electrodes adjacent to each other, wherein the adjusting electrodes adjacent to each other are electrically connected to each other.

* * * * *